(12) United States Patent
Kurupati

(10) Patent No.: US 12,216,744 B2
(45) Date of Patent: Feb. 4, 2025

(54) INTRUSION DETECTION ON COMPUTING DEVICES

(71) Applicant: Akamai Technologies, Inc., Cambridge, MA (US)

(72) Inventor: Sreenath Kurupati, Sunnyvale, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 17/001,325

(22) Filed: Aug. 24, 2020

(65) Prior Publication Data

US 2020/0387588 A1   Dec. 10, 2020

Related U.S. Application Data

(63) Continuation of application No. 15/626,216, filed on Jun. 19, 2017, now Pat. No. 10,754,935, which is a continuation of application No. 14/798,881, filed on Jul. 14, 2015, now Pat. No. 9,686,300.

(60) Provisional application No. 62/024,265, filed on Jul. 14, 2014.

(51) Int. Cl.
  *G06F 21/31*   (2013.01)
  *H04L 9/40*    (2022.01)

(52) U.S. Cl.
  CPC ............ *G06F 21/316* (2013.01); *H04L 63/08* (2013.01); *H04L 63/1425* (2013.01); *G06F 2221/2139* (2013.01)

(58) Field of Classification Search
  CPC ... H04L 63/1425; H04L 63/08; G06F 21/316; G06F 2221/2139

USPC ........................................................... 726/23
  See application file for complete search history.

(56) References Cited

U.S. PATENT DOCUMENTS

| | | | |
|---|---|---|---|
| 7,490,347 B1 * | 2/2009 | Schneider | H04L 63/105 713/157 |
| 9,686,300 B1 * | 6/2017 | Kurupati | H04L 63/1425 |
| 10,754,935 B2 * | 8/2020 | Kurupati | G06F 21/316 |
| 2003/0046072 A1 * | 3/2003 | Ramaswamy | G10L 17/02 704/240 |
| 2011/0016534 A1 * | 1/2011 | Jakobsson | H04L 67/535 726/28 |
| 2012/0143706 A1 * | 6/2012 | Crake | G06Q 20/3227 705/18 |
| 2014/0259129 A1 * | 9/2014 | Copsey | H04L 63/08 726/5 |

* cited by examiner

Primary Examiner — Matthew T Henning
(74) Attorney, Agent, or Firm — David H. Judson

(57) ABSTRACT

A non-transitory computer readable storage medium including instructions that, when executed by a computing system, cause the computing system to perform operations. The operations include collecting, by a processing device, raw data regarding a user action. The operations also include converting, by the processing device, the raw data to characteristic test data (CTD), wherein the CTD represents behavior characteristics of a current user. The operations also include identifying, by the processing device, a characteristic model corresponding to the behavior characteristics represented by the CTD. The operations also include generating, by the processing device, a predictor from a comparison of the CTD against the corresponding characteristic model, wherein the predictor comprises a score indicating a probability that the user action came from an authenticated user.

20 Claims, 5 Drawing Sheets

INTRUSION DETECTION ON COMPUTING DEVICES

BACKGROUND

Computing devices today include servers, desktops, laptops and mobile devices such as phones and tablets. In typical usage only authorized users are allowed to use the device. However due to various security weaknesses, unauthorized human and machine intrusion may occur.

To prevent unauthorized users from using a computing device, conventional techniques authenticate the user through an entry one-time authentication mechanism. This includes single-factor authentication (such as login/password) to multi-factor authentication (using techniques such as biometrics, hardware tokens, etc.). Security holes exist with these methods. For instance, user passwords can be compromised by either technical or social engineering techniques. Malicious users may also find ways to bypass the authentication systems through application backdoors or holes.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
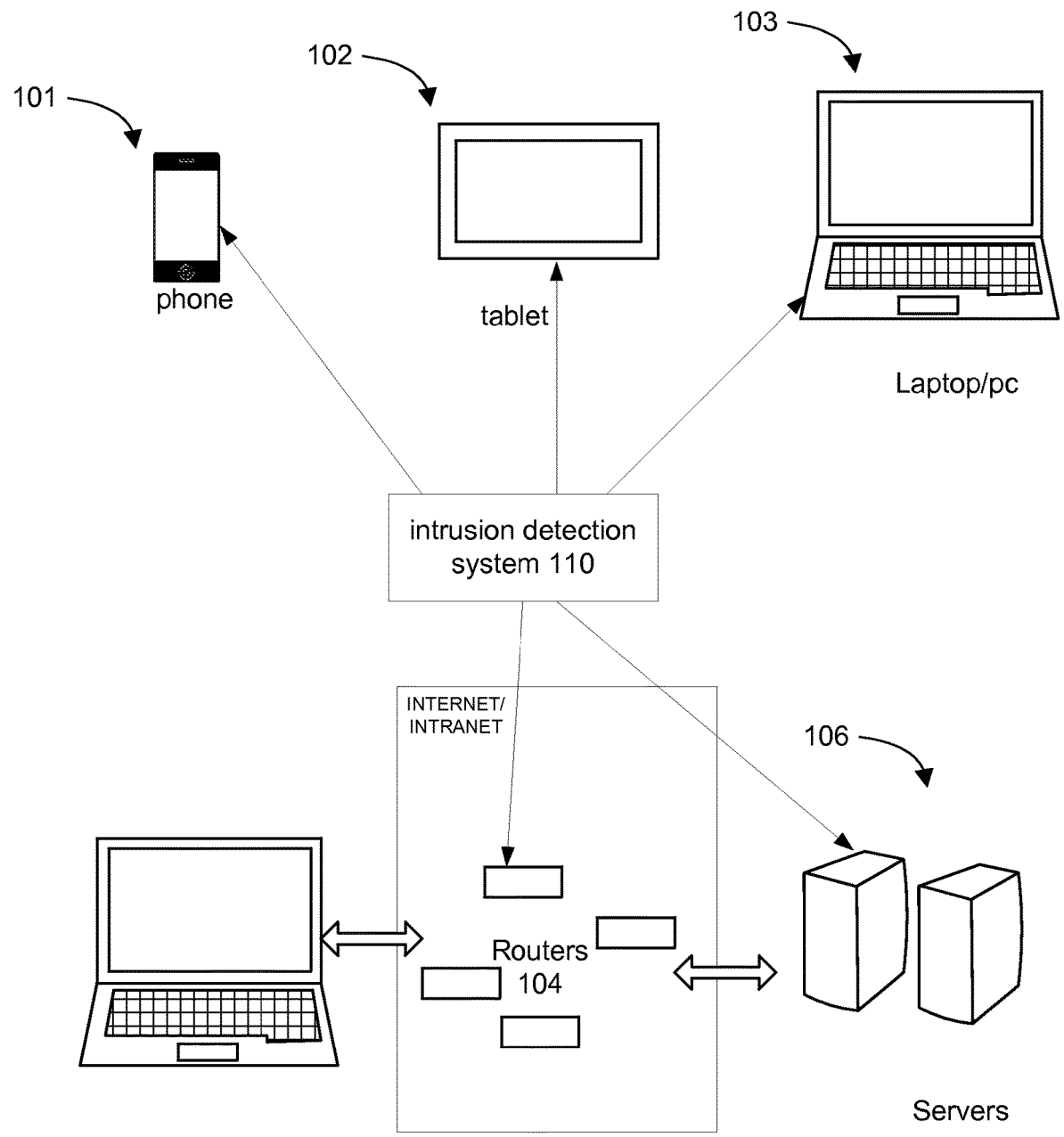
FIG. 1 illustrates some devices where the invention can be used. Note that there are other computing devices (not shown in the figure) where the invention can be applied.

Methods and systems for intrusion detection on computing devices are described. In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

The embodiments described herein can use an intrusion detection system (IDS) to detect malicious users who have successfully made an intrusion. These users can be both human and machine users. Conventional IDS s can monitor network traffic to detect whether intrusions have occurred. A major challenge for conventional IDSs is reducing the rate of false positives and false negatives. The embodiments described herein set forth a system having features to reduce the rates of false positives and false negatives.

As used herein, the term "user" may refer to human users, malicious machine programs, malicious scripts, or the like. Unlike the one-time, sign-on authorization and authentication methods, such as a login/password scheme, the embodiments described herein continuously checks the users operating behavior on the computing device to detect a malicious user. Furthermore, other embodiments of the system can employ numerous characteristic checks to improve the rate of false positives and false negatives. To enable this, a training period occurs on a device where "behavioral/characteristic" data is collected for a legitimate user. From this behavioral data, training is performed to generate characteristic models (also referred to as signatures). The behavioral characteristic data collected by the system may include a) an overall usage patterns of the user on the device; b) a kind (or type) of applications the user uses; c) a nature of the common commands the user uses within an application; d) characteristics on how the user switches or sequences between applications; e) mouse, keyboard, touch typing characteristics of the user; f) language characteristics of the user when typing words; and the like. The collected data is then put through a training process to generate characteristic models.

In some embodiments, after training, the system can be put into a "continuous authentication" mode. In this mode as the user is performing actions, his/her/its behavior is analyzed and matched against the expected behavioral model(s). In one embodiment, multiple behavioral characteristics can be analyzed by the system to generate a set of threat scores. This set of threat scores can help in system robustness. For instance, while a genuine user may occasionally deviate from one (or a few) behavioral characteristics, a malicious user would typically deviate from the authorized user on several behavioral characteristics allowing for fast and stronger threat detection.

The embodiments described herein may be implemented in processing logic that may comprise hardware (circuitry, dedicated logic, etc.), software (such as is run on a general purpose computing system or a dedicated machine), firmware (embedded software), or any combination thereof. Embodiments of the invention may run on various computing devices.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "communicating," "capturing," "executing," "defining," "specifying," "creating," "recreating," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 illustrates some computing devices where embodiments of an intrusion detection system 110 may be used. The devices include smart phones 101, tablets 102, and laptop/pc's 103. In other embodiments, the intrusion detection system 110 may be used in other devices, such as routers 104 and servers 106. The routers 104 may be routers deployed in a local area network, an intranet, or the Internet. Exemplary network architectures may include multiple client computing systems and multiple server computing systems coupled via a data communications network (e.g., public network such as the Internet or private network such as a local area network (LAN)). The network may include the Internet and network connections to the Internet. Alternatively, the intrusion detection system 110 may be located on any device in a common LAN, Personal area network (PAN), Campus Area Network (CAN), Metropolitan area network (MAN), Wide area network (WAN), wireless local area network, cellular network, virtual local area network, or the like. The intrusion detection system 110 can be implemented in a client device (also referred to just as client). The client may be a client workstation, a server, a computer, a portable electronic device, an entertainment system configured to communicate over a network, such as a set-top box, a digital receiver, a digital television, a mobile phone or other electronic devices. For example, portable electronic devices may include, but are not limited to, cellular phones, portable gaming systems, portable computing devices, or the like. The client may have access to the Internet via a firewall, a router, or other packet switching devices. The intrusion detection system 110 can be implemented in a server computing system. The server computing system may be a network appliance, a gateway, a personal computer, a desktop computer, a workstation, etc. Alternatively, the functionality of the intrusion detection system 110 can be distributed over two or more machines. Alternatively, other configurations are possible as would be appreciated by one of ordinary skill in the art having the benefit of this disclosure.

Figure 2:
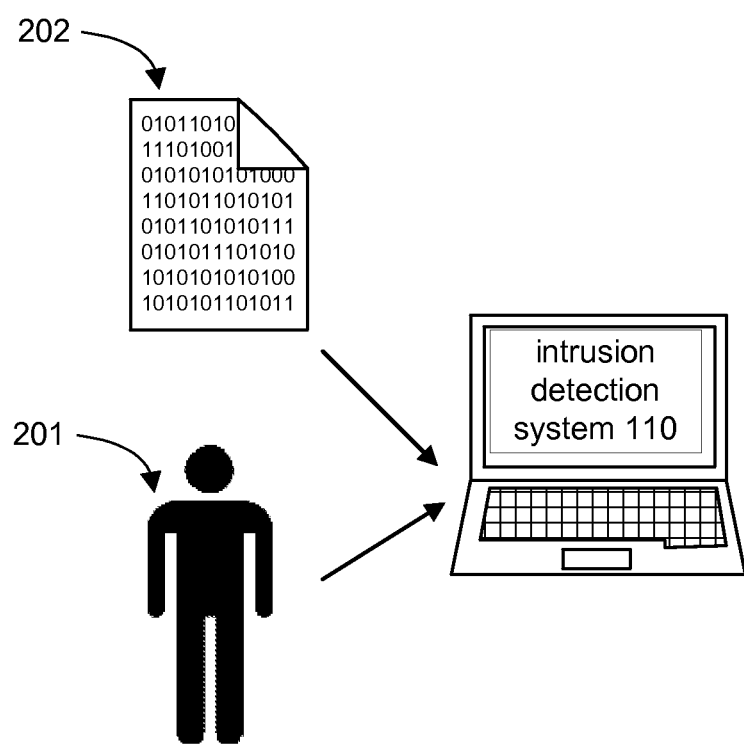
FIG. 2 illustrates the threats (human and machine) that the invention can detect in one embodiment.

FIG. 2 illustrates threat scenarios (human and machine) that the intrusion detection system 110 can detect in one embodiment. The threat can originate either from a human user 201 or a computer program 202. In the case of a human user, the threat scenarios may include a malicious unauthorized user, an authorized user with malicious intent, and an authorized user who accidentally triggers a malicious or malformed action. In the case of a computer program, the threat scenarios may include a malicious program, a genuine program infected with malicious code, or a genuine program that accidentally triggers a malicious action due to a bug or any other reason. Throughout the document, the term "user" may refer to either a human or computer program.

Figure 3:
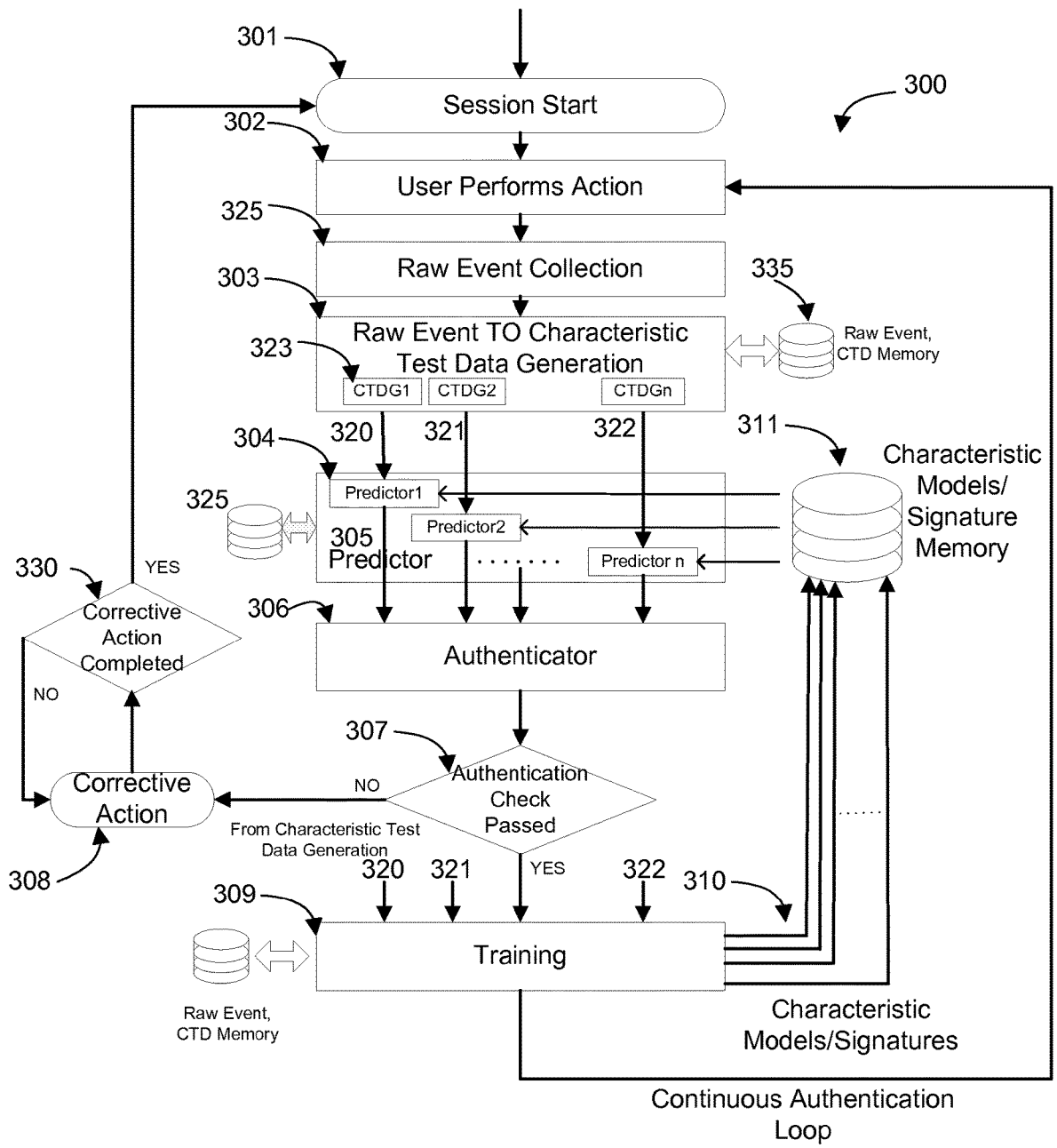
FIG. 3 illustrates the flow chart, processing stages and steps in one embodiment.

FIG. 3 is a flow diagram of one embodiment of a method 300 of intrusion detection. The method 300 is performed by processing logic that may comprise hardware (circuitry, dedicated logic, etc.), software (such as is run on a general purpose computing system or a dedicated machine), firmware (embedded software), or any combination thereof. In one embodiment, the intrusion detection system 110 of FIG. 1 or FIG. 2 performs the method 300. Alternatively, other components of a client computing system, server computing system, router, or other network device can perform some or all of the operations of method 300.

Referring to FIG. 3, a session start 301 simply indicates the start of the new user's actions. The authentication loop for the embodiment is a continuous authentication loop starting from a user action 302. From a human user the "action" is typically a user interface event, such as a mouse event, keyboard event, touches event, etc. From a computer program, the action is any call from the program to the operating system or other program/programs.

From this user or program action, raw event information 325 is collected. In one embodiment, the raw events can include keyboard events including the type of keyboard event (such as key press down, key release), key character code, key flags (such as Caps Lock, Control, Shift, etc.), and the application the keyboard event happened from, or any combination thereof. In one embodiment, the raw events can include mouse events, such as the type of mouse event (mouse move, single click, double click, drag event, etc.), the coordinate of the mouse position, timestamp of the mouse event, and application the mouse event happened from, or any combination thereof. In the case of mouse clicks, the raw event can include which mouse button was clicked. In one embodiment, the raw event can include touch events, such as the type of touch event (touch start, touch end, touch move, swipe, multi-finger touch events, etc.), the coordinate of the touch event, timestamp of the touch event, and the application the touch event happened from or any combination thereof. In one embodiment, the raw events can include various sensor events, such as from the accelerometer, gyroscope, proximity sensor, camera, etc. In one embodiment, the raw events can include system memory, disk, power, CPU utilization load, and other characteristics. While several examples of raw events and raw event data have been described, other events and data may also be used or detected. Different embodiments may incorporate various inputs at other devices and various events detected at or by fewer or more sensors, systems, or components.

The Raw Event information is then converted to characteristic test data by the raw event to characteristic test data generation stage 303. There are multiple possible characteristic test data (abbreviated as CTD in the document) values that can be constructed from the raw events. The concept is that each CTD represents a particular behavioral characteristic of the user that can be matched against the authorized/known behavioral characteristic to determine a threat. In some embodiments, the authorized/known behavioral characteristic is a model generated by compiling characteristics from an authenticated signature or user previously collected. The model may be generated by a continuous sampling of characteristic data or from a manually controlled sampling. In some embodiments, a model may be generated for each type of raw event. For example, a model may be generated and stored to the memory 311 which corresponds only to raw data from user events at a keyboard, or at a mouse, or a touchpad, or other user interface device. A model may also include combinations of one or more types of raw data. In some embodiments, the method 300 may alternate between generating a model against which it may check one or more CTD and checking the CTD against the model. For example, the method 300 may establish that a user is not an intruder or malicious through checking collected raw data against a stored model. Once the user is established, the method 300 may switch to collecting raw event data to add to the stored models or to create and store additional models. The method 300 may switch from checking against a model to building one or more models based on a certain schedule or other triggers or manual inputs. This is described in greater detail below with reference to the training stage 309. Other embodiments may include other schemes for training and checking/authenticating a user.

In some embodiments, the rate or level of collection and comparison of raw data regarding user action may vary based on a security level of a system or area of a system accessed by the user. For example, if a user is operating in a public section of a system, a cursory amount of raw data may be collected and verified to guard against malicious activity. If the user is operating in a sensitive portion of the system, more user data may be collected and compared more stringently to guard against malicious intent. Variables may include frequency of checks, amount of data checked, breadth of acceptable threshold for a passing score, and other criteria.

Security may also be dictated by a third party. For example, a system administrator (human or machine) may detect the presence of a user on a system. The administrator may initiate a check to establish the identity of the user by running a detailed check of the raw data from user action. In some embodiments, the administrator may also initiate a check if the user is detected as transitioning from a public portion of a system to a sensitive or secured portion of a system. Level of checks may also be dependent on timing of access. For example, if a user normally accesses a system between the hours of 7 am and 7 pm local time but unexpectedly accesses the system at 3 am, a more stringent check may be initiated. Other methods may employ other criteria for running checks at various levels of scrutiny.

CTD's range from low-level behavioral characteristics such as keystroke timing to high-level behavioral characteristics, such as commands entered. In one embodiment, each of these CTD values is generated by CTD generation stages such as CTDG1 323. In this document, the term "value" in CTD values does not necessarily imply a single number, but can imply a set of data samples (numbers, characters, alpha numeric values, etc.). Depending on the raw event, a CTDG stage may or may not generate a valid value. For instance if a CTDG stage is generating keyboard timings, it does not generate a CTD when only mouse movements are occurring. The term "Characteristic Test Data/CTD" is an illustrative term and other embodiments may use different terms. The concept involved is to translate raw events into behavioral test data suitable for matching against known/authorized behavior. In one embodiment, the generated CTD may be a combination of the current raw event/CTD with several previous raw events/CTD's. For instance, in one embodiment, a CTD for a multi-character text command can use the current keystroke and several past key strokes to generate the CTD. To facilitate this, in one embodiment, the previous raw events and CTD values can be stored or retrieved from the raw event/CTD memory 335.

In one embodiment, the various event patterns are sent to the predictor stage 305. In one embodiment, the predictor stage 305 includes multiple predictor stages such as Predictor 1 304. Each predictor stage conceptually generates a probability score that the CTD value came from an authorized user. Each predictor stage uses a model/signature from the characteristic model/signature memory 311. Each predictor stage may employ various techniques to perform the matching/probability analysis. Various embodiments of the matching/probability analysis technique include nearest neighbor, Manhattan distance, Euclidean distance, Neural Networks, Fuzzy Logic, K-means, SVM or other statistical/pattern matching/machine learning techniques. Different predictor stages may employ different techniques suitable for the particular behavioral characteristic.

In one embodiment, each predictor stage returns a score. In one embodiment, the score may be a distance score illustrating the distance between the incoming CTD and the characteristic model/signature. In one embodiment, the score may be probability number indicating the probability that the CTD value reflects a genuine/authorized characteristic. In one embodiment, the score may be a threat score. If a predictor stage does not have a valid authorized characteristic model from memory 311 to compare against, the predictor score may simply indicate that its result is a "don't care" result or a "not applicable" result. In one embodiment, such an occurrence can happen in the initial device usage where not enough authenticated user training has occurred to build a valid characteristic model/signature.

In one embodiment, the predictor 305 or any of the predictor stages may look at both the current predictor score as well as the history of predictor scores to come up with a composite predictor score. For instance, in one embodiment, the composite predictor score may be a composite of the previous N predictor scores, where N is a system parametric value. To facilitate this, in one embodiment, the previous predictor score and any other state information/history can be stored and retrieved from the predictor history stored in memory 325.

In one embodiment, the score/scores from the predictor 305 are sent to the Authenticator stage 306. The authenticator stage 306 looks at the score/scores from the predictor 305 and makes an aggregate decision on whether the user has passed the authentication check at that moment in time. In one embodiment, the authenticator stage 306 may use an AND function to determine the decision. In other words, the user may pass the authentication check if ALL the predictor scores pass a required threshold. In another embodiment, the authenticator stage 306 may use an OR function to determine the decision. In other words, the user may pass the authentication check if ANY of the predictor scores pass a required threshold. In another embodiment, the authenticator stage 306 may use a combination of AND/OR checks. For instance, the authenticator may put the scores into different groups. Each group may have a AND/OR check. All the group scores may then go through a final composite AND/OR check. In one embodiment, the authenticator may compare a count of valid scores against a threshold. In general, various functional compositions of the predictor scores can be used to make an aggregate decision. In some embodiments, the threshold used to make the aggregate decision may be set to a particular threshold level based on one or more factors. The threshold may be set manually or automatically. For example, if the user is operating in a high security area of the system, a narrower threshold for passing may be automatically set. If the area is a low security area, a broader threshold for passing may be used. The threshold may also vary based on the time of access, amount of information requested, quality of characteristic model available for checks, continuity of use (whether or not there are breaks in the detection of user inputs), or other manually or automatically adjusted parameters or factors.

In some embodiments, different scores or factors for computing the scores may be automatically or manually weighted differently based on one or more manually or automatically set or detected criteria. For example, if the user is determined to be a human user, keyboard and mouse data may be prioritized. If the access is primarily via touchpad, the touchpad data may be weighted greater than other criteria. Other embodiments may use other schemes for determining thresholds, criteria, or factors.

Once the authenticator makes an aggregate decision, the result is passed on to the Authentication check passed stage 307. If the result indicates failed authentication, the system moves into corrective action state 308. In the corrective action state 308, the offending user can no longer operate the device until a corrective action has occurred.

Various corrective actions are possible. In one embodiment, the corrective action can include locking out the user and asking the user to reenter his device password. In another embodiment, the corrective action can include locking out the user and asking the user to enter a password (created earlier) that is different from his primary device password. In one embodiment, the corrective action may be a second-factor authentication check. The second-factor check can include (but is not limited to) actions such as Short Message Service (SMS) push authentication, hardware tokens, biometrics, and the like. In one embodiment, the corrective action may not be a blocking action (the user can continue operation), but instead a system notification by email or other means to the administrator or the user indicating a possible threat can be issued.

A check 330 is done to indicate whether the corrective action has completed. If it has successfully completed, the system goes back to session start 301. Otherwise, the system remains in corrective action state 308.

In case the authentication check 307 passed, the system uses the new CTD values and/or new raw events to perform training 309. The intent of training is to generate characteristic models/signatures for the behavioral characteristics the system is checking. In one embodiment, training 309 receives the CTD values (320, 321, etc.) generated from the raw event to CTD Generation Stage 303. Training may involve using the current user raw events/CTD values as well as all or some of all the users past raw events/CTD values. To facilitate this, the training stage 309 has read and write access to a memory (shown as the Raw Event CTD Memory) including all/some of the last user raw events/CTD values. In addition to raw events/CTD values, training can also use data generated outside of the system. For instance, in one embodiment, training can use CTD data of non-authorized users from different devices as negative samples. In some embodiments, the training 309 can use CTD data of the authorized user generated from a different device. Various embodiments of the training technique include (but are not limited to) nearest neighbor, Manhattan distance, Euclidean distance, Neural Networks, Fuzzy Logic, K-means, or SVM. Different behavioral characteristics may employ training techniques suitable for that particular characteristic.

In one embodiment, the output of the training process 309 represents a characteristic model/signature that is stored in characteristic model/signature memory 311. The predictor 305 in the authentication loop uses this for characteristic matching purposes. In one embodiment, the system described in FIG. 3, proceeds in this continuous/constant-monitoring loop.

Figure 4:
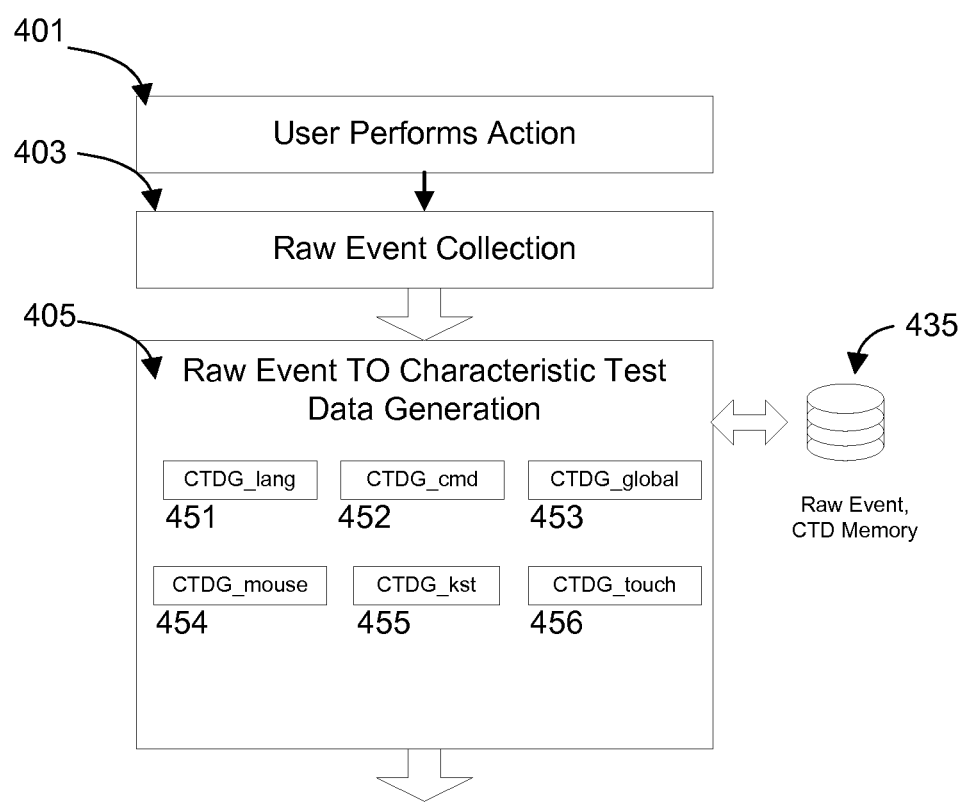
FIG. 4 illustrates the flow chart, processing stages and steps in one embodiment.

FIG. 4 illustrates one embodiment of an intrusion detection system to collect raw events and optionally convert raw events into CTD values. In one embodiment, the system in FIG. 4 may be included in the system described in FIG. 3 for raw event collection and CTD value generation. The system in FIG. 4 may be included in other authentication systems including one-time authentication systems as well as other existing IDSs. The system in FIG. 4 starts with a user action, where a user action may be from a human user or a computer system. For this action, raw events are collected. In one embodiment, the raw events can include keyboard events including the type of keyboard event (such as key press down, key release) key character code, key flags (such as Caps, CNTRL, Shift, etc.), and the application the keyboard event happened from, or some combination thereof. In one embodiment, the raw events can include mouse events such as the type of mouse event (mouse move, single click, double click, drag event, etc.), the coordinate of the mouse position, timestamp of the mouse event, and the application the mouse event happened from, or some combination thereof. In the case of mouse clicks, the raw event can include which mouse button was clicked. In one embodiment, the raw event can include touch events such as the type of touch event (touch start, touch end, touch move, swipe, multi-finger touch events, etc.), the coordinate of the touch event, timestamp of the touch event, and the application the touch event happened from, or combination thereof. In one embodiment, the raw events can include various sensor events such as from the accelerometer, gyroscope, proximity sensor, camera, etc. In one embodiment, the raw events can include system memory, disk, power, CPU utilization load, and other characteristics.

The Raw Event information is then converted to characteristic test data by the raw event to characteristic test data generation stage 405. There are multiple characteristic test data (optionally termed as CTD in the document) values that can be constructed from the raw events. The concept is that each CTD represents a particular behavioral characteristic of the user that can be matched against the authorized/known behavioral characteristic to determine a threat. CTD's range from low-level behavioral characteristics such as keystroke timing to high-level behavioral characteristics such as commands entered. In one embodiment, each of these CTD values is generated by CTD generation stages such as CTDG_lang. In this document, the term "value" in CTD values does not necessarily imply a single number, but can employ a set of data samples (number, characters, alpha numeric, etc.) for a particular characteristic. Depending on the raw event, a CTDG stage may or may not generate a valid value. In one example, if a CTDG stage is generating keyboard timings, it will not generate a CTD when only mouse movements are occurring. The term "Characteristic Test Data/CTD" is an illustrative term and other embodiments may use different terms. The concept involved is to translate raw events into behavioral test data suitable for matching against known/authorized behavior. In one embodiment, the generated CTD may be a combination of the current raw event/CTD with several previous raw events/CTD's. For instance, in one embodiment, a CTD for a multi-character text command can use the current keystroke and several past key strokes to generate the CTD. To facilitate this, in one embodiment, the previous raw events and CTD values can be stored and retrieved from the raw event/CTD memory 435.

In one embodiment, various Characteristic Test Data (CTD) Values are now described. The concept is that CTD values can characterize user behavior. In one embodiment, CTDG_lang 451 generates language characteristics. In one embodiment, the CTDG_lang value is the last word entered by the user. In one embodiment, this word can be used as a characteristic for word frequency, spelling accuracy, etc. In one embodiment, the CTDG_lang value is the last sentence entered by the user. In one embodiment, this sentence can be used as a characteristic for grammar, sentence construction choices, word choices in the context of a sentence, etc. In one embodiment, CTDG_lang is the last several characters entered by the user, where the length of the collected characters can be determined by a fixed number or by a character start/end delimiter or a combination of delimiter/fixed number or by other means.

In one embodiment, CTDG_cmd 452 can be used to generate command characteristics. In one embodiment, wherein the user is operating on a command shell (such as a unix shell), the CTDG_cmd value is the last command entered by the user and/or the command options and/or the order of command options and/or other syntactic/grammar aspects of the command entered. The concept being that behavioral characteristics of a user may include a preferred choice of commands, command options, order of command options, etc., and an unauthorized user may statistically deviate from the authorized users behavioral characteristics. In one embodiment, on GUI applications the CTDG_cmd value is based on the GUI commands entered by the user. The behavioral characteristics may include command sequence, time between commands, command short-cuts (for instance mouse click vs keyboard short cuts). In one embodiment, on browser applications, the CTDG_cmd value is the browser location entered by the user.

In one embodiment, CTDG_global 453 can be used to generate global device operation behavioral characteristics. In one embodiment, CTDG_global includes the list and order of applications opened by the user. In one embodiment, CTDG_global includes command short cuts (mouse commands versus keyboard shortcuts). In one embodiment, CTDG_global includes the behavior of the user in switching between applications (for instance using keyboard commands versus mouse cmds). In one embodiment, CTDG_global includes statistics on system memory, disk, power, CPU utilization load and other device characteristics.

In one embodiment, CTDG_mouse 454 can be used to generate mouse characteristic behavior. This includes mouse click counts, click durations, mouse movement speed, acceleration and jerk characteristics, mouse movement characteristics (such as linear movement versus curvature), mouse distance travelled, etc. This can also include mouse coordinates. The mouse characteristics can be paired with the CTD values generated from CTDG_lang, CTDG_cmd and CTDG_global.

In one embodiment, CTDG_kst can be used to generate keystroke characteristic behavior. This includes keystroke press/dwell time, time (delta) between keystrokes, etc. The keystroke timings can be paired with the CTD values generated from CTDG_lang, CTDG_cmd, and CTDG_global. For instance, if a user is entering a command on a unix terminal, the CTDG_cmd and CTDG_kst can paired to generate keystroke press times and inter-keystroke deltas for all the characters in the command. Certain commands entered on a command terminal can be very frequent and the keystroke timing behavior of a user can build into a strong behavioral characteristic that can be used for authorization.

In one embodiment, CTDG_touch can be used to generate touch characteristic behavior. This includes duration and pressure of the touch, movement direction for touch move events (such as swipes, etc.), movement curvature/linearity/coordinates, etc. The touch characteristics can be paired with CTD values generated from CTDG_lang, CTDG_cmd and CTDG_global.

Figure 5:
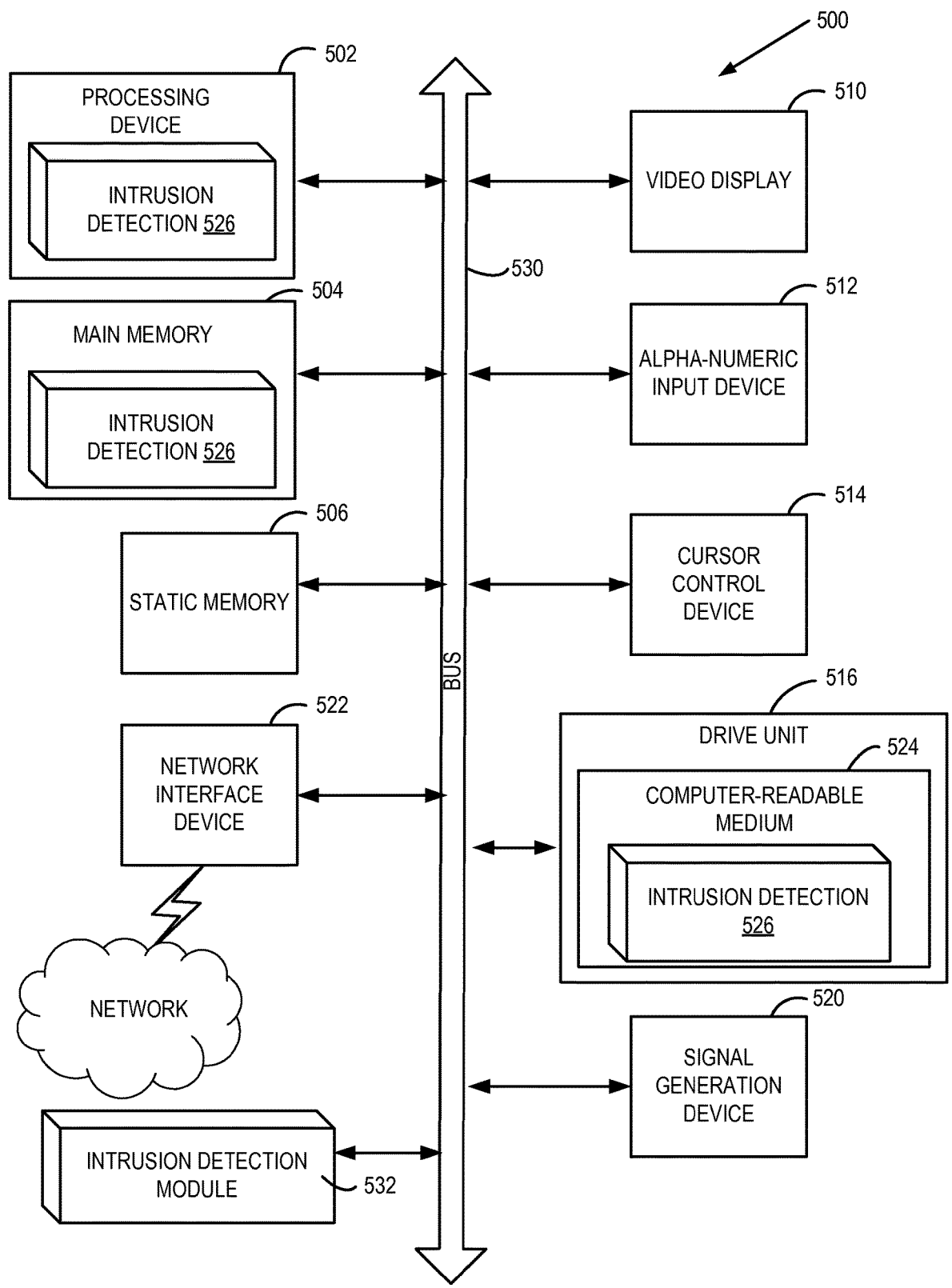
FIG. 5 illustrates a diagrammatic representation of a machine in the exemplary form of a computing system for intrusion detection.

FIG. 5 illustrates a diagrammatic representation of a machine in the exemplary form of a computing system 500 for intrusion detection. Within the computing system 500 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for intrusion detection, such as the method 300 described above. The computing system 500 represents various components that may be implemented in the devices described herein.

The exemplary computing system 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, each of which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic (e.g., intrusion detection 526) for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored one or more sets of instructions (e.g., intrusion detection 526) embodying any one or more of the methodologies or functions described herein. The intrusion detection 526 may also reside, completely or at least partially, within the main memory 504 and/or within the processing device 502 during execution thereof by the computing system 500, the main memory 504 and the processing device 502 also constituting computer-readable storage media. The intrusion detection 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The intrusion detection module 532, components, and other features described herein (for example in relation to FIGS. 1-4) can be implemented as discrete hardware components or integrated in the functionality of hardware components such as ASICS, FPGAs, DSPs, or similar devices. The intrusion detection module 532 may implement operations of intrusion detection as described herein with respect to FIG. 3. In addition, the intrusion detection module 532 can be implemented as firmware or functional circuitry within hardware devices. Further, the intrusion detection module 532 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
   performing behavioral analysis continuously by:
      collecting, by a processing device, raw data regarding a user action;
      converting, by the processing device, the raw data to characteristic test data (CTD), wherein the CTD represents one or more behavior characteristics of a current user;
      identifying, by the processing device, a characteristic model corresponding to the one or more behavior characteristics represented by the CTD; and
      generating, by the processing device, a predictor from a comparison of the CTD against the corresponding characteristic model, wherein the predictor comprises a score indicating a probability that the user action is permitted;
   at a given time, and based on a factor, automatically adjusting a threshold for determining whether the score indicates a probability that the user action is permitted, wherein the factor is one of: the user action occurring in an area of a system that has a particular security requirement, the user action occurring at a given time, the user action associated with a given information request, an extent to which the user action is continuous, and a quality of an available characteristic model;
   at the given time and based on the adjusted threshold, applying the corresponding characteristic model for the given CTD to generate the score; and
   taking an access control action based on the score.

2. The method of claim 1, further comprising training, by the processing device, the characteristic model from the collected raw data.

3. The method of claim 1, wherein the raw data is continuously collected to maintain an authentication of a user.

4. The method of claim 1, wherein the user action comprises at least one of keyboard event data, mouse event data, touch event data, gyroscope event data, accelerometer event data, camera event data, proximity sensor event data, or other sensor event data.

5. The method of claim 1, wherein the user action comprises data describing an access pathway followed by the current user.

6. The method of claim 1, wherein the CTD comprises data relating to a current user action and a past user action.

7. The method of claim 6, wherein the predictor comprises a composite score corresponding to a plurality of CTDs associated with raw data from an application over a time period.

8. The method of claim 1, wherein the predictor comprises a composite score corresponding to a plurality of CTDs associated with user actions at a plurality of applications.

9. A non-transitory computer readable storage medium including instructions that, when executed by a computing system, cause the computing system to perform operations comprising:
   performing behavioral analysis continuously by:
      collecting, by a processing device, raw data regarding a user action;
      converting, by the processing device, the raw data to characteristic test data (CTD), wherein the CTD represents one or more behavior characteristics of a current user;
      identifying, by the processing device, a characteristic model corresponding to the one or more behavior characteristics represented by the CTD; and
      generating, by the processing device, a predictor from a comparison of the CTD against the corresponding characteristic model, wherein the predictor comprises a score indicating a probability that the user action is permitted;
   at a given time, and based on a factor, automatically adjusting a threshold for determining whether the score indicates a probability that the user action is permitted, wherein the factor is one of: the user action occurring in an area of a system that has a particular security requirement, the user action occurring at a given time, the user action associated with a given information request, an extent to which the user action is continuous, and a quality of an available characteristic model;
   at the given time and based on the adjusted threshold, applying the corresponding characteristic model for the given CTD to generate the score; and
   taking an access control action based on the score.

10. The non-transitory computer readable storage medium of claim 9, wherein the operations further comprise training, by the processing device, the characteristic model from the collected raw data.

11. The non-transitory computer readable storage medium of claim 9, wherein the raw data is continuously collected to maintain an authentication of a user.

12. The non-transitory computer readable storage medium of claim 9, wherein the user action comprises at least one of keyboard event data, mouse event data, touch event data, gyroscope event data, accelerometer event data, camera event data, proximity sensor event data, or other sensor event data.

13. The non-transitory computer readable storage medium of claim 9, wherein the user action comprises data describing an access pathway followed by the current user.

14. The non-transitory computer readable storage medium of claim 9, wherein the CTD comprises data relating to a current user action and a past user action.

15. The non-transitory computer readable storage medium of claim 14, wherein the predictor comprises a composite score corresponding to a plurality of CTDs associated with raw data collected from an application over a time period.

16. The non-transitory computer readable storage medium of claim 9, wherein the predictor comprises a composite score corresponding to a plurality of CTDs associated with user actions at a plurality of applications.

17. A computing system, comprising:
a data storage device; and
a processing device, coupled to the data storage device, to:
  collect raw data regarding a user action;
  convert the raw data to characteristic test data (CTD), wherein the CTD represents one or more behavior characteristics of a current user;
  identify a characteristic model corresponding to the one or more behavior characteristics represented by the CTD; and
  generate a predictor from a comparison of the CTD against the corresponding characteristic model, wherein the predictor comprises a score indicating a probability that the user action is permitted, the collecting, converting, identifying and generating operations carried out continuously as a behavioral analysis;
  at a given time, and based on a factor, automatically adjust a threshold for determining whether the score indicates a probability that the user action is permitted, wherein the factor is one of: the user action occurring in an area of a system that has a particular security requirement, the user action occurring at a given time, the user action associated with a given information request, an extent to which the user action is continuous, and a quality of an available characteristic model;
  at the given time and based on the adjusted threshold, apply the corresponding characteristic model for the given CTD to generate the score; and
  take an access control action based on the score.

18. The computer system of claim 17, wherein the raw data is continuously collected to maintain an authentication of a user.

19. The computer system of claim 17, wherein the CTD comprises data relating to a current user action and a past user action.

20. The computer system of claim 17, wherein the predictor comprises a composite score corresponding to a plurality of CTDs associated with user actions at a plurality of applications.

* * * * *